Aug. 6, 1946.                M. WELLS                2,405,536
                         ELECTRODE HOLDER
                        Filed May 20, 1943
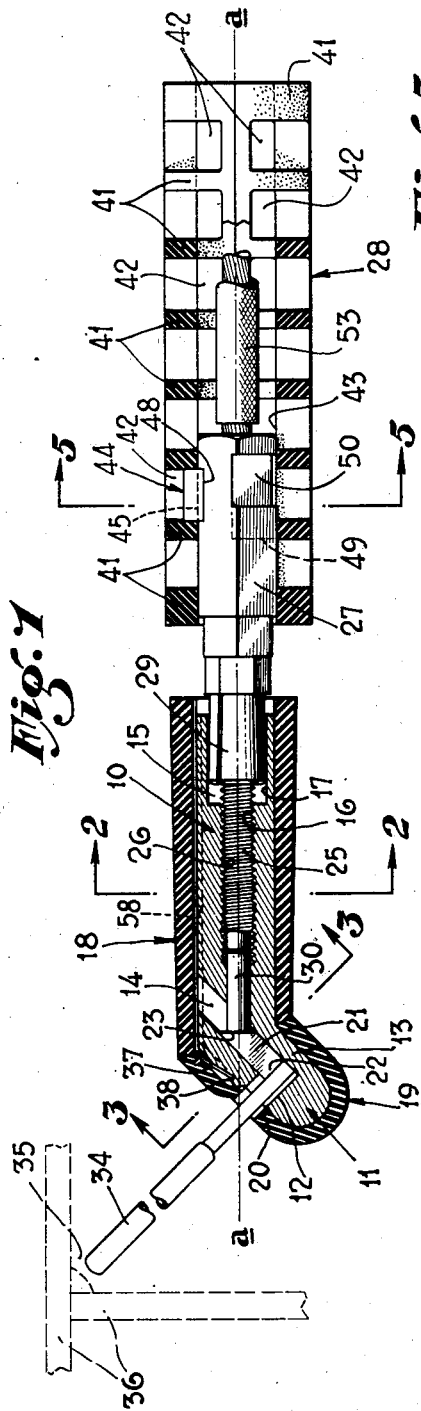
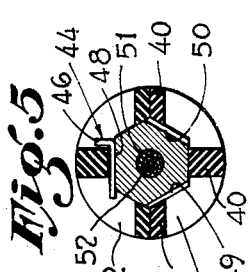
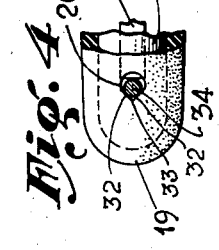
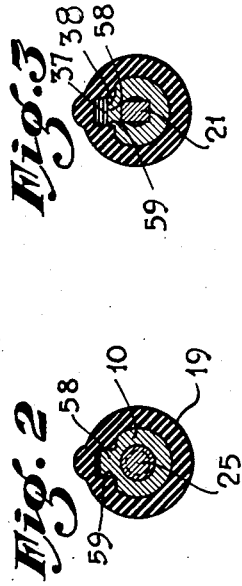
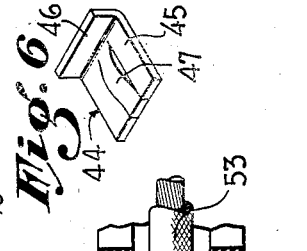
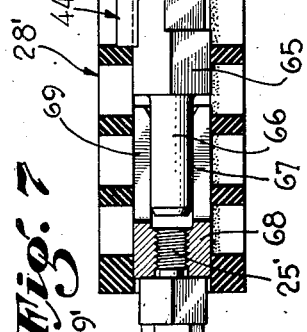
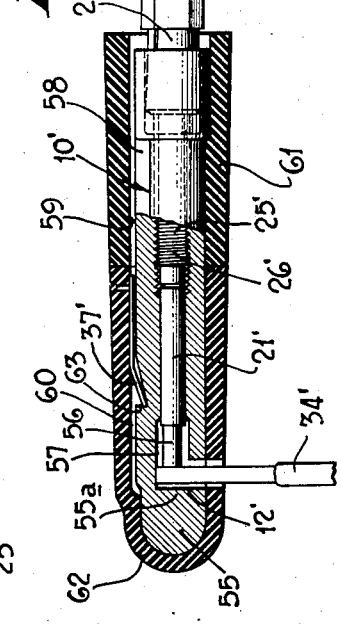
Inventor:
MARTIN WELLS,
By Jesse P. Whann
Attorney.

Patented Aug. 6, 1946

2,405,536

UNITED STATES PATENT OFFICE 2,405,536

ELECTRODE HOLDER

Martin Wells, Los Angeles, Calif.

Application May 20, 1943, Serial No. 487,681

10 Claims. (Cl. 219—8)

My invention relates to electrode holders such as used in electric welding to hold the electrode which ordinarily consists of a length of welding rod, and the invention is in some respects an improvement of the electrode holder disclosed in my application, Serial No. 446,884, filed June 13, 1942, now Patent No. 2,322,077, dated June 15, 1943.

It is an object of the invention to provide an electrode holder which will grip a welding rod in such manner that wastage of the rod will be minimized.

It is a further object to provide an electrode holder of slender form and of streamlined appearance which may be used in welding operations conducted in small spaces and in corners which are ordinarily reached only with difficulty, and which in many instances require that the welding rod be bent so as to extend diagonally with relation to the axis of the holder.

A further object of the invention is to provide an electrode holder wherein the metal parts are protected by insulation so as to protect the same from contact with grounded metal objects, thereby providing an electrode holder which may be laid down upon a grounded metal part without the necessity of having the electric current turned off at its source.

A further object of the invention is to provide an electrode holder having a blind opening to receive a short end portion of a welding rod and means within this opening to grip the rod so that it will be firmly held and so that welding current will be carried effectively to the rod.

A further object of the invention is to provide an electrode holder having a slender body with rod holding means at the forward end thereof, and with a tubular insulator of slender streamlined form to completely protect the body.

A further object of the invention is to provide an electrode holder having a body with an opening to receive a welding rod and an insulator means arranged so as to protect the opening against entry of splatter thereinto.

A further object of the invention is to provide an electrode holder having a body part and a handle which is readily adjustable relatively to the handle.

It is a further object of the invention to provide an electrode holder wherein one of the jaws for gripping the electrode comprises a portion of the body or consists of a forward extension on the body, and the other jaw member comprises a rod arranged to move axially and being separate from the screw which acts to move it axially, whereby the end of the rod in engagement with the electrode will engage the end of the electrode without rotation, thereby producing a positive clamping effect and avoiding injury to the end of the rod, such as burring or channeling.

Further objects and advantages of the invention will be brought out in the following part of the specification.

Referring to the drawing which is for illustrative purposes only,

Fig. 1 is a sectional view of a preferred form of my invention.

Fig. 2 is a cross section taken as indicated by the line 2—2 of Fig. 1.

Fig. 3 is a cross section taken as indicated by the line 3—3 of Fig. 1.

Fig. 4 is a fragmentary partly sectioned view looking toward the rod opening of the device, and showing a portion of a rod extending therein.

Fig. 5 is a section through the handle of the device, taken as indicated by the line 5—5 of Fig. 1.

Fig. 6 is a perspective view of the key which is employed to lock the handle in its different positions of adjustment relatively to the body of the holder.

Fig. 7 is a sectional view of another form of the invention.

In the form of the invention shown in Fig. 1 I provide a metal body 10 having a front end portion 11 bent at an angle to the axis $a$—$a$ of the body. In the end portion 11 of the body 10 there is a rod opening 12, the inner end of which is closed by a wall 13, this opening 12 being disposed diagonally of the axis $a$—$a$.

A second opening 14 extends into the body 10 so as to meet the inner portion of the opening 12. This opening 14 is substantially rectangular in cross section and extends along the axis of the end portion 11 of the body 10, and is preferably perpendicular to the axis of the rod opening 12. A third opening 15 extends inward from the rear end of the body 10, along the axis $a$—$a$, to meet the diagonal opening 14. The intermediate portion of the opening 15 is provided with threads 16 and the rear end of the opening 15 is preferably enlarged so as to form a counterbore 17.

A tubular insulator 18 surrounds that portion of the body 10 which is coaxial with the axis $a$—$a$, and a cap 19 of insulating material is replaceably secured upon the end portion 11, this cap having an opening 20 therein which coincides with the rod opening 12. In the second opening 14 there is a clamping member 21 comprising a steel or hard metal bar of rectangular cross section. The front end 22 of this bar 21 is perpendicular to its side faces, but the rear end 23 of the member 21 is cut diagonally so that it will be preferably substantially perpendicular to the axis a—a. It will be noted that the upper end of the opening 14 is uncovered when the insulator tube 18 is removed from the body 10.

In the opening 15 there is an actuating member 25 for moving the part 21. This actuating member 25 has a screw 26 to engage the threads 16 of the body 10 and a rearwardly extending part 27 to which a handle 28 is secured. At the forward end of the extension 27 there is a slotted cylindrical member 29 which extends into the counterbore 17 and frictionally engages the metal wall of the body 10 surrounding the counterbore to assist in conducting current from the member 25 to the body 10. The member 25 is provided with associated means for transmitting movement to the bar 21. This associated means may consist of a cylindrical extension formed integrally with, or separately from, the screw 26.

As shown in Fig. 4, the rod opening 12 is not circular in cross section, but comprises angularly disposed faces 32 which define a V-shaped channel 33 to receive the end portion of a welding rod 34. This channel 33 is opposed to the end face 22 of the bar 21, and when the bar 21 is forced toward the end of the rod 34 lying in the opening 12, a three-point engagement with the rod is made, thereby assuring that the rod will be firmly held. The pressural engagement of the bar 21 with the end of the rod 34 is accomplished by rotation of the member 25 so that the screw 26 thereof will advance in the threads 16 of the body 10, thereby forcing the part 30 against the rear end face 23 of the bar 21, causing such bar 21 to move outward or forward in the opening 14 and firmly grip the rod 34. The rod 34, gripped in the rod opening 12, as hereinbefore described, is disposed diagonally with relation to the axis a—a of the rod holder, and when so positioned, may be readily used for welding operations in a corner 35 formed by plates indicated by dotted lines 36.

The insulator cap 19 has therein a spring catch 37 to engage a notch 38 in the end portion 11, in accordance with the teachings of my previously identified patent to hold this insulator cap 19 in place. Should this cap 19 be broken or otherwise injured, a replacement cap may be readily applied by merely sliding the same into position on the end portion 11 of the body 10, whereupon the spring catch 37 will then hold the cap in place.

The handle 28 is reticulated and comprises longitudinal bars 40, preferably four in number, connected by arcuate bar portions 41 spaced apart so as to leave openings 42 which communicate with the axial opening 43 of the handle 28. The extension 27 is preferably polygonal in cross section, for example, hexagonal, and the axial opening 43 of the handle 28 is of corresponding cross section so as to make a relatively tight sliding fit with the extension, thereby making it possible to slide the handle 28 axially on the exsion 27 through different positions of adjustment. The handle 28 and the extension 27 are locked in a number of these different positions of adjustment by a key 44 of flat form and which may be conveniently made as shown in Fig. 6.

This key 44 consists of a plate portion 45 and a flange portion 46, the plate portion 45 being slitted so as to form a finger 47 which may be slightly bent for the purpose of producing frictional engagement with the upper and lower walls of a key receiving channel formed between the extension 27 and the handle 28. In selected faces of the extension 27 shallow slots or key ways 48, 49, and 50 are cut, as shown in Figs. 1 and 5, these keyways being offset from each other, and each being of such width and depth as to receive the body portion 45 of the key 44 therein. The handle 28 may be slid onto the extension 27 to a position wherein one of the keyways is aligned with an opening 42, and the key 44 is then slid into place as shown in Fig. 5, with the flange 46 projecting into the opening 42 and between adjacent arcuate walls 41, the flange 46 thereby limiting axial movement of the handle 28 on the extension 27 by reason of the portion 46 being positioned so that it will be engaged by the arcuate bars 41 lying on opposite sides thereof when axial movement of the handle 28 is attempted.

The extension 27 has an opening 51 in its end in which the ends 52, Fig. 5, of the copper strands of a cable 53 are soldered in accordance with customary practice. From the cable 53 welding current is carried through the parts 27, 25, and 10 to the welding rod or electrode 34.

The form of the invention shown in Fig. 7 embodies all of the principles previously set forth with relation to this holder shown in Fig. 1, with the exception that the rod opening 12' extends substantially perpendicularly from the axis of the body 10'. In the form of the invention shown in Fig. 7, those parts which are the equivalents of or similar to the parts shown in Fig. 1 will be designated by like numerals with the prime mark added.

The body 10' is of cylindric form with a rounded end 55. The bar 21' for gripping the inner end of the rod 34' has its forward end 56 diametrally reduced so as to provide therearound a space 57 in which small particles of substance may accumulate without binding the member 21'. The bar 21' is separate from the screw 25' so that it is not caused to rotate and therefore does not rotate in engagement with the inwardly projecting end of the electrode 34'. The bar or rod 21' is of hard metal alloy unaffected by the highest temperature to which it is subjected when in use in the electrode holder.

In the forms of the invention shown in Figs. 1 and 5, one of the jaw means for gripping the end of the electrode lies within the supporting structure of the other jaw means. For example, the bar 21 of Fig. 1 comprises one of the jaw means. It is disposed in the opening 14 which extends within the diagonally bent portion or extension 13 formed integrally with the main portion of the metal body 10. Therefore, a single removable snap arm insulator 19 insulates and projects both of the jaw means which are brought into clamping engagement with the end of the electrode 34. Likewise, in Fig. 7, the rounded end portion 55 which projects forwardly from the body 10' includes therein a jaw 55a which engages one side of the inwardly projecting end of the electrode 34', whereas the end 56 of the bar 21 comprises the remaining jaw to engage the opposite side of the inwardly projecting end of the electrode 34'. The insulator cap 62 which is removably secured in the manner described covers both jaw means since it is quite evident that both of the jaw means lie therewithin.

In this form of the invention the body 10' is provided with a ridge 58 on its upper portion which matches with grooves 59 and 60 formed within insulators 61 and 62, this interengagement preventing rotation of the members 61 and 62 on the body 10'. A notch 63 is formed near the forward end of the ridge 58 and in such position may be engaged by a spring finger 37' secured within the insulator 62, thereby replaceably securing this insulator 62 which in turn holds the tubular insulator 61 in place on the body 10'.

A further feature of the invention consists in the provision of means within the insulated handle of the electrode holder for detachably connecting the electric cable to the conductive parts of the electrode holder. As shown in Fig. 7, the cable 53 passes into the outer end of the handle 28' and is connected to a hexagonal metal body 65 which is adjustably secured in the hexagonal opening of the handle by a clip 44. The metal body 65 has a cylindric extension 66 projecting leftwardly or forwardly therefrom, within the axial opening of the handle 28' so as to be protected from injury, this cylindric projection entering a companion cylindric opening 67 in a hexagonal metal body 68 which is connected to the rightward end of the screw 25'. One of the interengaging members is slotted so as to have yieldability. In the form of the invention shown, I have shown longitudinal slots 69 in the wall of the body 68 which surrounds the cylindric projection 66. When the parts are in engagement as shown, rotative force is transmitted from the handle 28' to the body 68 and thence through the screw 25' and its associated parts so as to actuate the clamping means of the holder. An axial pull on the handle 28' will move the body 68 out of the leftward end of the handle, disengaging the body 68 from the handle and from the connector body 65 which remains in the handle, so that the handle 28' remains connected to the end of the cable 53. This arrangement enables each welder to keep with him as personal equipment an electrode holder assembly, minus the handle which may be readily attached to the cable and handle assembly.

I claim as my invention:

1. In an electrode holder of the class described, the combination of: a metal body having a rod opening leading in from the face thereof, and a second opening leading into said body to meet said rod opening; operable means acting within said second opening to pressurally engage the end of a rod inserted in said rod opening and thereby grip said rod; replaceable insulator means comprising a cup of insulating material slidable onto said body from the front end thereof, said cup having therein an opening defined by a wall surrounding the mouth of said rod opening to guard said rod opening from entry of splatter thereinto; yieldable holding means within said cup providing an engagement operative between said cup and said body to hold said cup on said body; a handle connected to said body; and means for connecting an electric conductor to said body.

2. In an electrode holder of the class described, the combination of: a metal body having a rod opening leading in from the face thereof, and a second opening leading into said body to meet said rod opening; replaceable insulator means disposed on said body comprising a hollow member of insulating material slidable into a position surrounding said body; yieldable means within said hollow member and engaging said body and said hollow member so as to hold said insulator means on said body; a handle rotatably connected to said body; gripping means acting in said second opening in response to rotation of said handle relatively to said body to pressurally engage the end of a rod inserted in said opening and thereby tightly grip the same, there being means connecting said handle and said gripping means whereby rotation of said handle will actuate said gripping means; and means for connecting an electric conductor to said body.

3. In an electrode holder of the class described, the combination of: an elongated metal body having a rod opening near its front end and an axial opening leading in from its rear end to meet said rod opening, said body having a rearwardly faced shoulder thereon; operable means acting within said axial opening to pressurally engage the end of a rod inserted in said rod opening and thereby grip said rod; a handle connected to said body; means for connecting an electric conductor to said body; a tubular insulator surrounding the rearward portion of said body; a replaceable cap of insulating material slidable onto the front end of said body, said cap having a wall portion with an opening therein substantially aligned with said rod opening, said wall portion acting as a guard to prevent entry of splatter into said rod opening; and a yieldable catch means in said cap to engage said shoulder on said body when said cap is slid into position thereon to hold said cap on said body.

4. In an electrode holder of the class described, the combination of: a body; rotatable means connected to said body, said rotatable means having a rearwardly extending part with transverse slots in the surface thereof; rod gripping means carried by said body operable by relative rotation of said rotatable means and said body; a handle of insulating material adjustable axially on said extending part of said rotatable means and having an opening in which said extending part is received and a side opening through the wall thereof; and key means insertable through said side opening of said handle to engage a selected slot in said part to hold said handle on said part in different positions of adjustment, there being means of frictional engagement between said key means and at least one of the walls of said slot to hold said key means therein.

5. In an electrode holder of the class described, the combination of: a body having on its front end a bent part disposed at an angle to the axis of the body, said bent part having a rod opening extending thereinto, a second opening in said body disposed at an angle to said rod opening and meeting said rod opening, and a third opening extending into said body at an angle to said second opening; a clamping member movable in said second opening so as to engage a rod inserted in said rod opening; operating means extending into said third opening to engage and move said clamping member; means to actuate said operating means; a handle having the effect of supporting said body; and means for connecting an electric conductor so that current will be carried to the rod held by the holder.

6. In an electrode holder of the class described, the combination of: a body having on its front end a bent part disposed at an angle to the axis of the body, said bent part having a rod opening extending thereinto, a second opening in said body disposed at an angle to said rod opening and meeting said rod opening, said second opening being non-circular in cross section, and a third opening extending into said body at an angle to said second opening; a clamping member movable in said second opening so as to engage a rod inserted in said rod opening, said member having a sloping face at its rear end; operating means extending into said third opening to engage said sloping face and move said clamping member; means to actuate said operating means; a handle having the effect of supporting said body; and means for connecting an electric conductor so that current will be carried to the rod held by the holder.

7. In an electrode holder of the class described, the combination of: a metal body having a rod opening leading in from a face thereof to meet an internal opening in said body, said body having a longitudinal shoulder and a transverse shoulder thereon; means in said internal opening to grip a rod in said rod opening; a handle for supporting said body; means for connecting an electric conductor to said body; and a tubular insulator slidable onto said body, said tubular insulator having a shoulder to engage said longitudinal shoulder of said body so as to prevent rotation of said insulator on said body and having therein a resilient finger to engage said transverse shoulder so as to prevent removal of said insulator from said body.

8. In an electrode holder of the class described, the combination of: a metal body having a rod opening leading in from a face thereof to meet an internal opening in said body, said body having a transverse shoulder thereon; means in said internal opening to grip a rod in said rod opening; a handle for supporting said body; means for connecting an electric conductor to said body; and a tubular insulator slidable onto said body, said tubular insulator having therein a resilient finger to engage said transverse shoulder so as to prevent removal of said insulator from said body.

9. In an insulating means for an electrode holder having a metal body having a rod opening leading in from a face thereof to meet an internal opening in said body, said body having a longitudinal shoulder and a transverse shoulder thereon, means in said internal opening to grip a rod in said rod opening, a handle for supporting said body, and means for connecting an electric conductor to said body, the combination of: a tubular insulator slidable onto said body, said tubular insulator having a shoulder to engage said longitudinal shoulder of said body so as to prevent rotation of said insulator on said body and having therein a resilient finger to engage said transverse shoulder so as to prevent removal of said insulator from said body.

10. In an insulating means for an electrode holder having a metal body having a rod opening leading in from a face thereof to meet an internal opening in said body, said body having a transverse shoulder thereon, means in said internal opening to grip a rod in said rod opening, a handle for supporting said body, and means for connecting an electric conductor to said body, the combination of: a tubular insulator slidable onto said body, said tubular insulator having therein a resilient catch means to engage said transverse shoulder so as to prevent removal of said insulator from said body.

MARTIN WELLS.